June 6, 1972   E. ENRIQUEZ   3,667,777
TOWABLE SPRING SCOOTER FOR PRODUCING UNDULATING MOTIONS
Filed Dec. 9, 1970
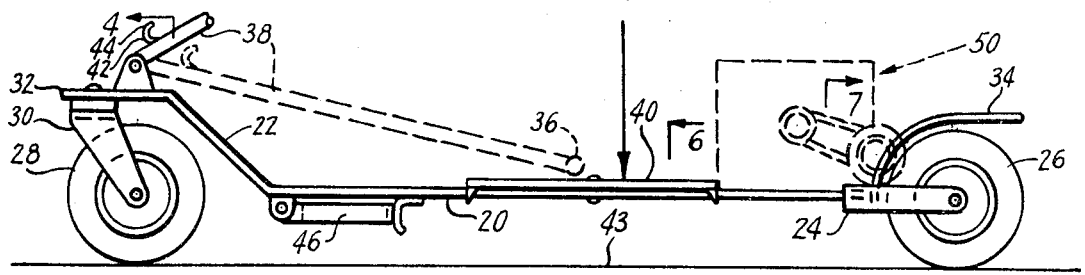
FIG. 1
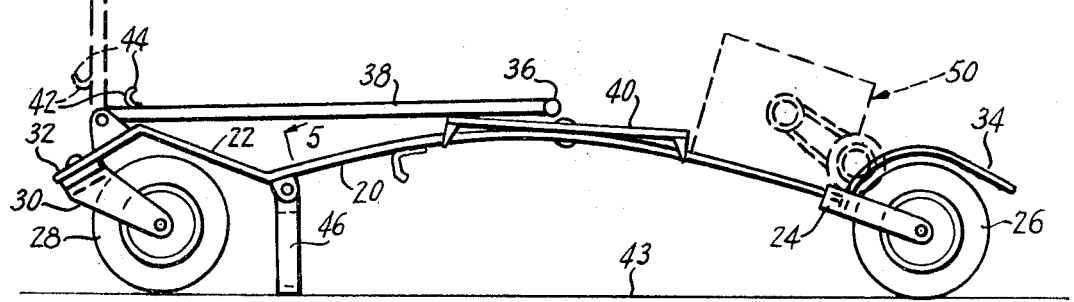
FIG. 2
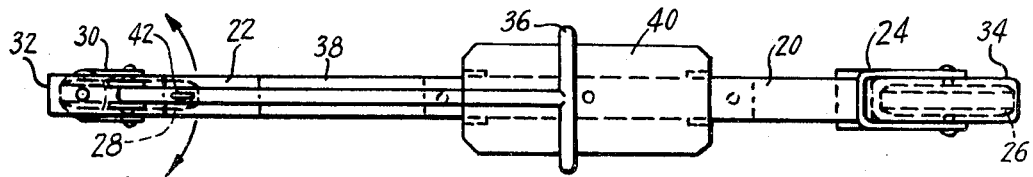
FIG. 3
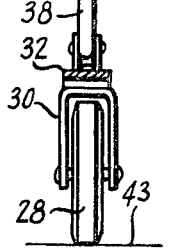 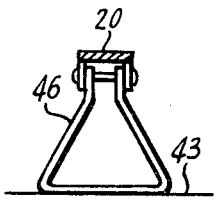 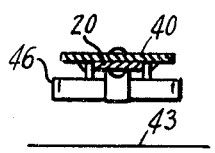 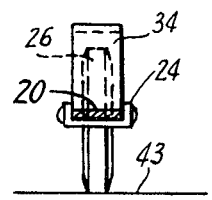
FIG. 4   FIG. 5   FIG. 6   FIG. 7
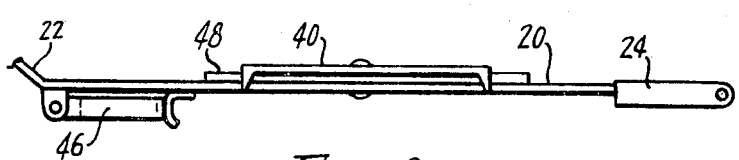
FIG. 8
INVENTOR.
EDUARDO ENRIQUEZ
BY Victor J. Evans &co.
ATTORNEYS.

United States Patent Office 3,667,777
Patented June 6, 1972

3,667,777
TOWABLE SPRING SCOOTER FOR PRODUCING UNDULATING MOTIONS
Eduardo Enriquez, 6125 Gila Drive, El Paso, Tex. 79905
Filed Dec. 9, 1970, Ser. No. 96,563
Int. Cl. B60d 1/04; A63g 13/00
U.S. Cl. 280—480                    2 Claims

ABSTRACT OF THE DISCLOSURE

A wheeled spring body having a handle bar assembly, supporting platform, and powered drive means thereon.

---

This invention relates to a device for simulating water skiing on the ground either while pulled by a motored bicycle such as a mini-bike or propelled under its own power with an engine.

Accordingly, a primary object of this invention is to provide means that will give the rider a soft water-like wavy sensation.

Another object of this invention is to provide means allowing the rider to direct his path of travel in the same manner as a water skier.

A further object of this invention is to provide means for the safety and training of the rider.

The above and other objects of this invention will become apparent to those skilled in the art after a consideration of a detailed description of preferred embodiments of this invention taken together with the accompanying drawing where:

FIG. 1 is a side elevational view of the simulator;
FIG. 2 is a side elevational view thereof in its stored position;
FIG. 3 is a plan view thereof;
FIG. 4 is a sectional view taken on line 4—4 of FIG. 1;
FIG. 5 is a sectional view taken on line 5—5 of FIG. 2;
FIG. 6 is a sectional view taken on line 6—6 of FIG. 1;
FIG. 7 is a sectional view taken on line 7—7 of FIG. 1; and
FIG. 8 is a side elevational view of a reinforced body.

Referring in detail to the drawing, there is shown a spring leaf 20 having a bent front portion 22 and having a U-shaped portion 24 at the rear end thereof. A rear wheel 26 is pivotally mounted within portion 24 and a front wheel 28 is pivotally mounted within a caster 30 which in turn is pivotally mounted to end 32 of portion 22 for rotation of caster 30 about an axis transverse with the plane of end 32. Extending from the rear end of spring 20 is a curved guard 34 which curves over tire 26 and serves as the rider's braking mechanism by pushing guard 34 down onto the surface of tire 26 when it is desired to stop or slow down. A handle bar 36 extends transverse with a shaft 38 at the end thereof which is in turn pivotally mounted at the bottom end thereof to end 32 for movement along a plane intersecting the longitudinal axis of spring 20. A rectangular shaped platform 40 is mounted to the top surface of spring 20 along the middle thereof for supporting the rider in a standing position. Extending from the front of shaft 38 is a hook 42 having an end portion 44 pointing in the direction of an axis which intersects the longitudinal axis of shaft 38 below spring 20 forming an acute angle thereby facilitating disengagement of a pole line from hook 42 as the rider is in motion merely by swinging shaft 38 forward a few degrees from normal riding position allowing the pull line to slip out of hook 42. FIG. 1 shows the scooter on the ground 43 with the weight of a person, as shown by the arrow, pressing down on spring 20 to the point where the top surface thereof is parallel with the bottom surface of platform 40. FIG. 2 shows the scooter in the storage state with front wheel 28 lifted above ground 43 due to a kick stand 46 pivotally mounted to the bottom surface of spring 20. It should also be noted that FIG. 2 shows the dotted line position of shaft 38 for disengaging the pull line from hook 42 by allowing it to slide up and off end 44.

The rider will perceive a sensation of skiing on water while holding on to the pivoting handle bar 36 and shaft 38 and standing on platform 40 which will produce a wave-like feeling due to road conditions or leg action. Caster 30 and wheel 38 will automatically turn to a new path of travel when the rider tilts his body and the scooter toward one side or the other while following the pulling vehicle, in the same manner that a water skier sways sideways as the towing boat turns.

It should be noted that additional spring sections such as spring 48 may be secured to spring 20 in order to increase tension for extra heavy persons as shown in FIG. 8. While preferred embodiments have been illustrated and described, it should be understood by those skilled in the art that many additional changes and modifications may be resorted to without departing from the spirit and scope of the invention. For instance, as shown in FIGS. 1 and 2, an engine and pulley arrangement 50 could be mounted on spring 20 and connected to rear wheel 26 and brake linkage (not shown). For those riders who would prefer to steer by turning handle bar 36 in a horizontal plane until they get used to turning by swaying their bodies, a quickly detachable joint (not shown in the drawing) to connect shaft 38 and handle bar 36 directly to front wheel 28 would be utilized. Also, if the rider wanted to go for a long ride, a seat (not shown) or a leaning bar (not shown) could be attached to platform 40.

I claim:
1. A water skiing simulator, comprising a curved spring bar, a U-shaped element extending from the rear end of said bar, a wheel rotatably mounted between the legs of said element, a bent bar portion extending at an angle from the front end of said bar, a castered front wheel connected to said bent bar portion, platform means mounted on said spring bar to support a rider for straightening said bar so that it is parallel with the end of said bent bar portion and so that it is in the same horizontal plane as said element and transmitting a wavy up and down motion to the rider for causing the sensation of skiing over a water surface as said simulator is being moved over ground, shaft means connected to said end of said bent bar portion so that the rider standing on said platform means may steer the simulator solely by swaying his body in the absence of a steering mechanism connected to said front wheel, and hitch means on the shaft means for engaging a tow line and for disengaging the simulator while it is in motion without the necessity for handling the tow line, and brake means extending from the rear end of said bar and curving over a portion of the surface of said rear wheel for slowing down or stopping the simulator.

2. The water skiing simulator of claim 1, wherein said shaft means includes a shaft pivotally mounted to said end of said bent bar portion and said hitch means including a hook extending downward from the front of said shaft and curving upward at the end of said hook with the end thereof pointing in a direction along an axis which intersects with the longitudinal axis of said shaft at a point below the bottom of said hook forming an acute angle allowing the rider to disengage the tow line from said hook by merely pivoting said shaft forward from the normal riding position.

References Cited

UNITED STATES PATENTS

| | | | |
|---|---|---|---|
| 675,453 | 6/1901 | Sturgess | 280—292 |
| 1,213,454 | 1/1917 | Brown | 280—87.04 A |
| 1,274,889 | 8/1918 | Johnson | 280—87.04 A |
| 1,890,755 | 12/1932 | Shepherd | 280—87.03 |
| 2,491,076 | 12/1949 | Benazzoli | 180—33 D |
| 2,819,907 | 1/1958 | Thoresen | 280—7.13 |
| 3,027,574 | 4/1962 | Meehan | 280—480 X |
| 3,100,020 | 8/1963 | Sonntag | 280—87.04 AX |
| 3,161,416 | 12/1964 | Lechene et al. | 280—480 X |
| 3,224,524 | 12/1965 | Laher | 280—87.03 X |

FOREIGN PATENTS

| | | | |
|---|---|---|---|
| 664,944 | 2/1929 | France | 280—87.03 |

LEO FRIAGLIA, Primary Examiner

U.S. Cl. X.R.

180—33 D; 280—1.1, 292, 301, 87.03, 87.04 D